(12) United States Patent
Shimada

(10) Patent No.: US 11,501,568 B2
(45) Date of Patent: Nov. 15, 2022

(54) INFORMATION PROCESSING APPARATUS, PERSON SEARCH SYSTEM, PLACE ESTIMATION METHOD, AND NON-TRANSITORY COMPUTER READABLE MEDIUM STORING PROGRAM

(71) Applicant: NEC CORPORATION, Tokyo (JP)

(72) Inventor: Taisuke Shimada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/040,210

(22) PCT Filed: Oct. 26, 2018

(86) PCT No.: PCT/JP2018/039858
§ 371 (c)(1),
(2) Date: Sep. 22, 2020

(87) PCT Pub. No.: WO2019/181047
PCT Pub. Date: Sep. 26, 2019

(65) Prior Publication Data
US 2021/0012095 A1  Jan. 14, 2021

(30) Foreign Application Priority Data
Mar. 23, 2018  (JP) .............................. JP2018-056862

(51) Int. Cl.
*G06V 40/16* (2022.01)
*G06T 7/215* (2017.01)
*G06V 20/40* (2022.01)

(52) U.S. Cl.
CPC ............ *G06V 40/172* (2022.01); *G06T 7/215* (2017.01); *G06V 20/41* (2022.01); *G06V 20/46* (2022.01);

(Continued)

(58) Field of Classification Search
None
See application file for complete search history.

(56) References Cited

U.S. PATENT DOCUMENTS

| 9,715,627 | B2* | 7/2017 | Chujo ...................... F24F 11/30 |
| 2009/0080716 | A1* | 3/2009 | Yanagi ............... G06K 9/00288 |
| | | | 382/118 |

(Continued)

FOREIGN PATENT DOCUMENTS

| JP | 2013-092955 A | 5/2013 |
| JP | 2016-143312 A | 8/2016 |

(Continued)

OTHER PUBLICATIONS

International Search Report of PCT/JP2018/039858 dated Jan. 22, 2019 [PCT/ISA/210].

*Primary Examiner* — Delomia L Gilliard

(57) ABSTRACT

An information processing apparatus (1) includes: a presence information acquisition unit (2) that acquires presence information that is generated based on images shot for each of a plurality of predetermined places and indicates a place where a person is present at a point in time of the shooting of the images; and a presence place estimation unit (3) that estimates a place where a specific person is currently present from among the plurality of predetermined places based on the acquired presence information. The presence information includes time information at the point in time of the shooting. The presence place estimation unit (3) estimates the place where the specific person is currently present using a presence probability of the specific person at the predetermined places, the presence probability being calculated based on an amount of time elapsed from the point in time of the shooting.

9 Claims, 7 Drawing Sheets

(52) U.S. Cl.
 CPC .. *G06V 40/166* (2022.01); *G06T 2207/30201* (2013.01); *G06T 2207/30242* (2013.01)

(56) References Cited

U.S. PATENT DOCUMENTS

| | | | | |
|---|---|---|---|---|
| 2015/0248587 | A1* | 9/2015 | Oami | H04N 7/181 |
| | | | | 382/103 |
| 2015/0281655 | A1* | 10/2015 | Turetken | G06K 9/00771 |
| | | | | 348/159 |
| 2015/0294159 | A1* | 10/2015 | Takahashi | G06V 20/41 |
| | | | | 382/103 |
| 2016/0261808 | A1* | 9/2016 | Tojo | H04N 5/23218 |
| 2018/0061065 | A1* | 3/2018 | Mayuzumi | G06V 40/172 |
| 2019/0132556 | A1* | 5/2019 | Itoh | G06T 1/0007 |

FOREIGN PATENT DOCUMENTS

| | | |
|---|---|---|
| JP | 2016-163328 A | 9/2016 |
| JP | 2018-032950 A | 3/2018 |
| WO | 2014/061342 A1 | 4/2014 |
| WO | 2014/148395 A1 | 9/2014 |

* cited by examiner

INFORMATION PROCESSING APPARATUS, PERSON SEARCH SYSTEM, PLACE ESTIMATION METHOD, AND NON-TRANSITORY COMPUTER READABLE MEDIUM STORING PROGRAM

CROSS REFERENCE TO RELATED APPLICATIONS

This application is a National Stage of International Application No. PCT/JP2018/039858, filed Oct. 26, 2018, claiming priority to Japanese Patent Application No. 2018-056862, filed Mar. 23, 2018, the contents of all of which are incorporated herein by reference in their entirety.

TECHNICAL FIELD

The present disclosure relates to an information processing apparatus, a person search system, a place estimation method, and a program.

BACKGROUND ART

Various techniques for analyzing video image data shot by a camera have been proposed. For example, Patent Literature 1 discloses a technique for generating, based on an image of an input video image, a presence probability map indicating the probability of appearance of an object in the image. Further, Patent Literature 2 discloses a technique for finding a passenger, who is scheduled to board but is not yet on board even though the departure time is approaching, by using a video image of the passenger shot by a monitoring camera.

CITATION LIST

Patent Literature

Patent Literature 1: Japanese Unexamined Patent Application Publication No. 2013-92955
Patent Literature 2: International Patent Publication No. WO 2014/148395

SUMMARY OF INVENTION

Technical Problem

When a person to be searched for moves from one place to another, the position of the person to be searched for that is specified based on an image including the person to be searched for may differ from the actual current position of the person to be searched for. It is required to search for the person to be searched for even in such a case.

Patent Literature 1 is a technique for generating a presence probability map indicating the probability of presence of a certain person, but the technique cannot be used for searching for a specific person such as the person to be searched for. Further, Patent Literature 2 discloses that when the monitoring camera installed in an area division line has shot the last video image of a passenger who is not on board, it is estimated that the passenger is staying in either of the areas on both sides of the area division line. However, such an estimation is based on the assumption that the passenger who is not on board has not moved, so that it is not possible to thoroughly search for a person to be searched for in a case in which he/she moves.

Therefore, one of the objects to be attained by an example embodiment disclosed herein is to provide an information processing apparatus, a person search system, a place estimation method, and a program that are capable of searching for a person to be searched for who is scheduled to move.

Solution to Problem

An information processing apparatus according to a first aspect includes: presence information acquisition means for acquiring presence information that is generated based on images shot for each of a plurality of predetermined places and indicates a place where a person is present at a point in time of the shooting of the images; and presence place estimation means for estimating a place where a specific person is currently present from among the plurality of predetermined places based on the presence information acquired by the presence information acquisition means, in which the presence information includes time information at the point in time of the shooting, and the presence place estimation means estimates the place where the specific person is currently present using a presence probability of the specific person at the predetermined places, the presence probability being calculated based on an amount of time elapsed from the point in time of the shooting.

A person search system according to a second aspect includes: presence information generation means for generating, based on images shot for each of predetermined places, presence information indicating a place where a person is present at a point in time of the shooting of the images; and presence place estimation means for estimating a place where a specific person is currently present from among the plurality of predetermined places based on the presence information, in which the presence information includes time information at the point in time of the shooting, and the presence place estimation means estimates the place where the specific person is currently present using a presence probability of the specific person at the predetermined places, the presence probability being calculated based on an amount of time elapsed from the point in time of the shooting.

A place estimation method according to a third aspect includes: acquiring presence information that is generated based on images shot for each of a plurality of predetermined places and indicates a place where a person is present at a point in time of the shooting of the images; and estimating a place where a specific person is currently present from among the plurality of predetermined places based on the acquired presence information, in which the presence information includes time information at the point in time of the shooting, and in the estimation of the place where the specific person is present, the place where the specific person is currently present is estimated using a presence probability of the specific person at the predetermined places, the presence probability being calculated based on an amount of time elapsed from the point in time of the shooting.

A program according to a fourth aspect causes a computer to execute: a presence information acquisition step of acquiring presence information that is generated based on images shot for each of a plurality of predetermined places and indicates a place where a person is present at a point in time of the shooting of the images; and a presence place estimation step of estimating a place where a specific person is currently present from among the plurality of predetermined places based on the presence information acquired in the presence information acquisition step, in which the presence information includes time information at the point in time of the shooting, and in the presence place estimation step, the place where the specific person is currently present is estimated using a presence probability of the specific person at the predetermined places, the presence probability being calculated based on an amount of time elapsed from the point in time of the shooting.

Advantageous Effects of Invention

According to the above-described aspects, it is possible to provide an information processing apparatus, a person search system, a place estimation method, and a program that are capable of searching for a person to be searched for who is scheduled to move.

DESCRIPTION OF EMBODIMENTS

<Outline of Example Embodiment>

Figure 1:
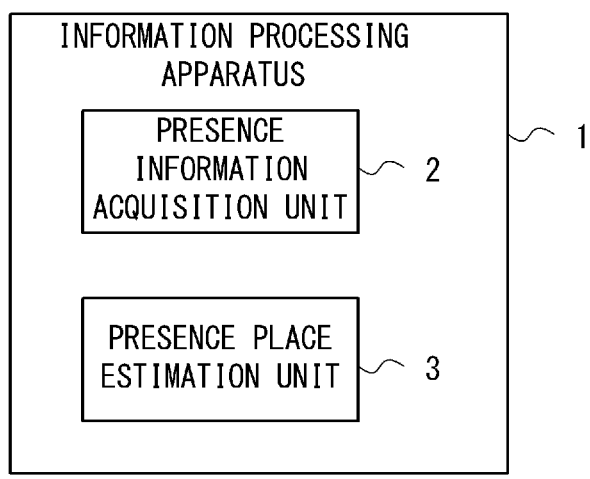
FIG. 1 is a block diagram showing an example of a configuration of an information processing apparatus according to an outline of an example embodiment.

Prior to describing an example embodiment in detail, an outline of the example embodiment is given. FIG. 1 is a block diagram showing an example of a configuration of an information processing apparatus 1 according to the outline of the example embodiment. As shown in FIG. 1, the information processing apparatus 1 includes a presence information acquisition unit 2 and a presence place estimation unit 3.

The presence information acquisition unit 2 acquires presence information generated based on images shot for each of a plurality of predetermined places. Here, the presence information is information indicating a place where a person is present at the point in time of the shooting of the images. The presence information includes time information at the point in time of the shooting, that is, shooting time information. Note that any method may be employed for the acquisition performed by the presence information acquisition unit 2. Thus, the presence information acquisition unit 2 may acquire the presence information generated by other apparatuses via a network, or may acquire the presence information by loading the presence information stored in a storage device (not shown) of the information processing apparatus 1.

The presence place estimation unit 3 estimates a place where a specific person is currently present from among the plurality of predetermined places based on the presence information acquired by the presence information acquisition unit 2. It should be noted that presence place estimation unit 3 estimates the place where the specific person is currently present using a presence probability of the specific person at the predetermined places, the presence probability being calculated based on an amount of time elapsed from the point in time of the shooting.

If the specific person to be searched for is scheduled to move, there is a high possibility that the person has moved from the place where the specific person was shot in the past as time elapses. Meanwhile, in the information processing apparatus 1, the presence place estimation unit 3 calculates the presence probability of the specific person based on the amount of time elapsed from the point in time of the shooting and then estimates the place where the specific person is currently present. Thus, it is possible to perform a search that takes into consideration the movement of the person.

<Details of Example Embodiment>

Figure 2:
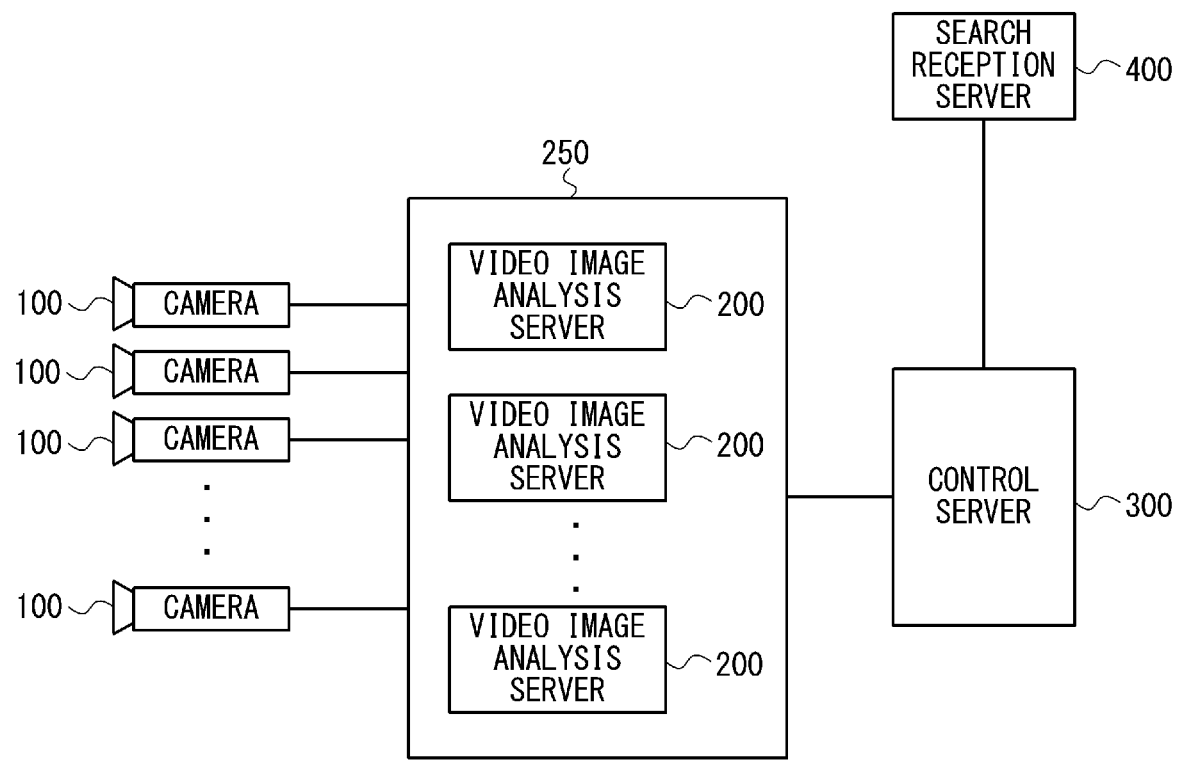
FIG. 2 is a block diagram showing an example of a configuration of a person search system according to the example embodiment.

Next, details of the example embodiment are described. FIG. 2 is a block diagram showing an example of a configuration of a person search system 10 according to the example embodiment. As shown in FIG. 2, the person search system 10 includes a plurality of cameras 100, a video image analysis server group 250 including a plurality of video image analysis servers 200, a control server 300, and a search reception server 400. The person search system 10 is a system that searches for a person by analyzing images shot by the cameras 100 disposed at the respective plurality of predetermined places.

As described above, the cameras 100 are disposed at the respective predetermined places and each of the cameras 100 shoots the surroundings of the place where it is disposed. Each of the cameras 100 is connected to the video image analysis server group 250 via a wired or wireless network, and transmits shot video image data to the video image analysis server group 250. Note that the camera 100 transmits the shot video image data to one of the video image analysis servers 200 included in the video image analysis server group 250 in accordance with an instruction from a video image acquisition control unit 201 described later. Note that the video image data includes shooting time information.

The camera 100 may be installed at any place. For example, the installation place of the camera 100 may be an airport, a harbor, a theme park, a shopping center, a stadium, and the like. Further, the camera 100 may be installed not only in one building but also interspersed in a plurality of buildings. In this example embodiment, a route in the forward direction is determined in advance for these installation places. Accordingly, a person moves along this route in the forward direction.

The video image analysis server group 250 includes the plurality of video image analysis servers 200. The video image analysis server 200 is a server that performs image recognition processing on the video image data transmitted by the camera 100 and recognizes a person in the shooting region (i.e., the periphery of the installation place of the camera 100) of the camera 100. In this example embodiment, although the video image analysis server 200 recognizes a person by processing for recognizing the face of the person, it may recognize the person by using other appearance features of the person. The video image analysis server 200 is connected to the control server 300 via a wired or wireless network, and transmits a result of analysis processing to the control server 300.

The search reception server 400 is a server that receives a search request from a client terminal (not shown). For example, the search reception server 400 receives a search request including information specifying a person (hereinafter referred to as a search target person) to be searched for (found). For example, if the installation places of the cameras 100 are areas in the airport, the search target person may be a missing passenger who is scheduled to board. Obviously, the search target person is not limited to the passenger who is scheduled to board, and may be any person. The search reception server 400 is connected to the control server 300 via a wired or wireless network, and transmits information of the search target person to the control server 300.

The control server 300 is a server that estimates the current location of the search target person based on the result of analysis processing performed by the video image analysis server group 250. Further, the control server 300 changes a system configuration or setting based on the result of the estimation so that the video image analysis server group 250 can focus on video image analysis for a place where the search target person is highly likely to be present.

Figure 3:
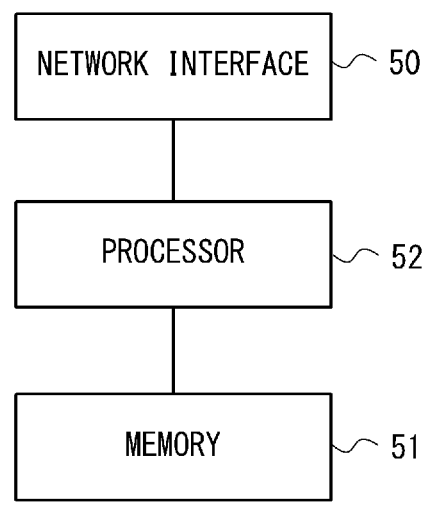
FIG. 3 is a block diagram showing an example of a hardware configuration of each of a video image analysis server, a control server, and a search reception server according to the example embodiment.

Details of the video image analysis server 200, the control server 300, and the search reception server 400 are described below. FIG. 3 is a block diagram showing an example of a hardware configuration of each of the video image analysis server 200, the control server 300, and the search reception server 400. As shown in FIG. 3, each of the video image analysis server 200, the control server 300, and the search reception server 400 includes, for example, a network interface 50, a memory 51, and a processor 52.

The network interface 50 is used to communicate with other apparatuses. The network interface 50 may include, for example, a network interface card (NIC).

The memory 51 is composed of, for example, a combination of a volatile memory and a non-volatile memory. Note that each of the video image analysis server 200, the control server 300, and the search reception server 400 may include a storage device such as a hard disk in addition to the memory 51.

The memory 51 is used to store software (a computer program) including at least one instruction executed by the processor 52.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The processor 52 loads the software (the computer program) from the memory 51 and executes the loaded software, thereby performing the processing of the video image analysis server 200, the processing of the control server 300, or the processing of the search reception server 400, which will be described later. As described above, each of the video image analysis server 200, the control server 300, and the search reception server 400 functions as a computer. The processor 52 may be, for example, a microprocessor, a Micro Processor Unit (MPU), or a Central Processing Unit (CPU). The processor 52 may include a plurality of processors.

The memory 51 or the storage device may be used as a presence information storage unit 302 described later. Note that the camera 100 has the same hardware configuration as that shown in FIG. 3 and functions as a computer.

Figure 4:
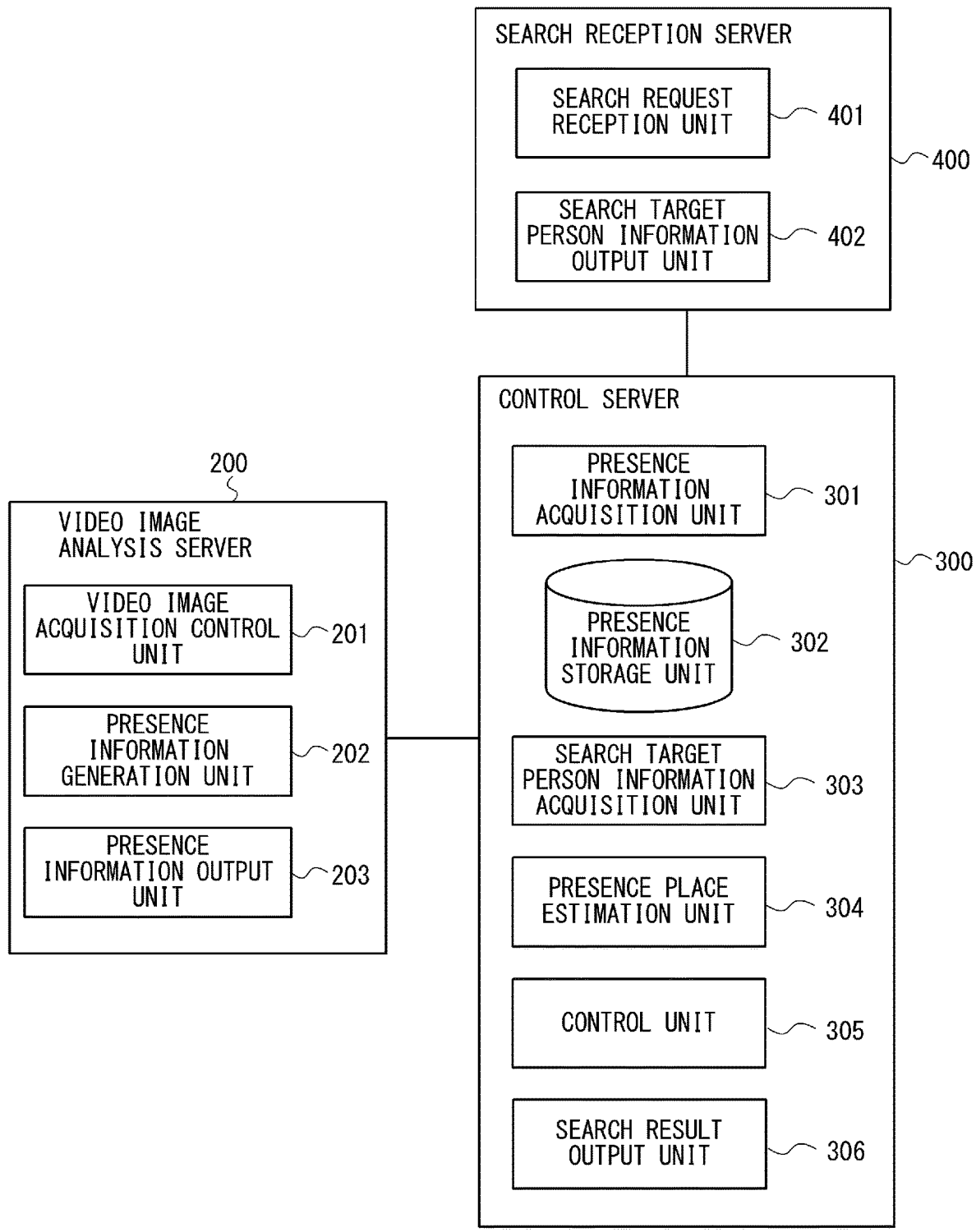
FIG. 4 is a block diagram showing an example of a functional configuration of the video image analysis server, the control server, and the search reception server according to the example embodiment.

FIG. 4 is a block diagram showing an example of a functional configuration of the video image analysis server 200, the control server 300, and the search reception server 400. First, the video image analysis server 200 is described. As shown in FIG. 4, the video image analysis server 200 includes the video image acquisition control unit 201, a presence information generation unit 202, and a presence information output unit 203.

The video image acquisition control unit 201 acquires video image data from one or more cameras 100. The data acquired by the video image acquisition control unit 201 includes images shot by the cameras 100 and shooting time information. In this example embodiment, the video image analysis server 200 analyzes video image data of the camera 100 specified by a control unit 305 of the control server 300. Thus, the video image acquisition control unit 201 acquires the video image data from the camera 100 specified by the control unit 305. Specifically, the video image acquisition control unit 201 requests the video image data from the camera 100 specified by the instruction from the control unit 305 of the control server 300. In response to this request, the camera 100 transmits the shot video image data to the video image analysis server 200 of which the video image acquisition control unit 201 has requested the camera 100 to transmit this video image data.

The presence information generation unit 202 generates presence information based on images shot for each predetermined place. Here, the presence information is information indicating a place where a person is present at the point in time of the shooting of the images. In this example embodiment, the presence information generation unit 202 performs a real-time analysis on the shot images by image recognition processing and identifies the faces included in the shot images, thereby generating presence information. Specifically, for example, the presence information generation unit 202 generates presence information by performing matching between a predetermined feature value (a feature value of a face image) indicating an appearance feature of a person included in an image shot by the camera 100 and a predetermined feature value indicating an appearance feature of a specific person. That is, the presence information generation unit 202 generates presence information indicating that the specific person is present at the place within the shooting range of the camera 100 at the point in time of the shooting of the shot images by performing matching between the above two predetermined feature values. Thus, the presence information includes time information (i.e., the shooting time information) at the time of the shooting. In this example embodiment, the presence information is used to search for a person, but it may also be used as information for entering or leaving a predetermined place, such as an airport, by face authentication.

As described above, the presence information is information specifying who has been present, when he/she has been present, and where he/she has been present.

The presence information output unit 203 outputs the presence information generated by the presence information generation unit 202 to the control server 300.

Next, the search reception server 400 is described. As shown in FIG. 4, the search reception server 400 includes a search request reception unit 401 and a search target person information output unit 402.

The search request reception unit 401 receives a search request. The search request is information including information specifying the search target person. The information specifying the search target person includes, for example, identification information (hereinafter referred to as search target person information) such as the name, an ID, and passport information of the search target person. A user specifies the search target person, for example, by operating a client terminal connected for communication with the search reception server 400 via a wired or wireless network. By doing so, a search request is transmitted from the client terminal to the search reception server 400. The search target person information output unit 402 outputs search target person information that is specified by the search request received by the search request reception unit 401 to the control server 300.

Next, the control server 300 is described. As shown in FIG. 4, the control server 300 includes a presence information acquisition unit 301, the presence information storage unit 302, a search target person information acquisition unit 303, a presence place estimation unit 304, the control unit 305, and a search result output unit 306.

The presence information acquisition unit 301 acquires presence information generated based on images shot for each of a plurality of predetermined places. In this example embodiment, the presence information acquisition unit 301 acquires the presence information transmitted by the video image analysis server 200. The presence information acquisition unit 301 stores the acquired presence information in the presence information storage unit 302.

The presence information storage unit 302 is a storage area for storing presence information. Presence information is sequentially accumulated in the presence information storage unit 302 by a real-time analysis of video image data from each camera 100.

The search target person information acquisition unit 303 acquires search target person information transmitted by the search reception server 400.

The presence place estimation unit 304 estimates a place where a specific person is currently present from among the plurality of predetermined places where the cameras 100 are installed based on the presence information acquired by the presence information acquisition unit 301. More specifically, the presence place estimation unit 304 first searches the presence information storage unit 302 for the latest presence information about the search target person specified by the search target person information. Next, the presence place estimation unit 304 estimates the place where the specific person (i.e., the search target person) is currently present using a presence probability of the specific person calculated based on the amount of time elapsed from the shooting time indicated by the searched presence information. That is, the presence place estimation unit 304 estimates the place where the specific person is currently present using the presence probability calculated based on the amount of time elapsed from the shooting time of the shot images used to generate the latest presence information about the specific person. Here, the presence probability is a probability that the specific person is present at the predetermined places where the cameras 100 are installed.

In this example embodiment, the presence place estimation unit 304 calculates the presence probability by, for example, using a monotone function using the aforementioned elapsed time as a variable. Here, a monotone increasing function f(t) expressed by the following Expression (1) is used as a specific example.

[Expression 1]

$$f(t) = \begin{cases} \dfrac{t}{T_{XYi}} & (0 \le t \le T_{XYi}) \\ 1 & (t > T_{XYi}) \end{cases} \quad (1)$$

Note that t is the aforementioned elapsed time. That is, t is the difference between the current time and the shooting time corresponding to the latest presence information about a specific person who is the search target person. Further, $T_{XYi}$ is the time it takes for a person who has appeared at a place X to appear at a place Yi (hereinafter referred to as a scheduled moving time), and is a predetermined value based on, for example, a statistical result about people moving from the place X to the place Yi. Here, the place X is a place where the search target person is present indicated by the latest presence information about the search target person among the places where the cameras 100 are installed, and is referred to as a first place. Further, the place Yi is a place which can be reached from the place X among the places where the cameras 100 are installed, and is referred to as a second place. Note that it is assumed that there are n places (n is an integer equal to or larger than one) that can be reached from the place X. That is, "i" of Yi is an index number from one to n, and the total number of places from the place Y1 to the place Yn that can be reached from the place X is n.

The presence place estimation unit 304 calculates a presence probability $p_{Yi}(t)$ that the search target person is currently present at the place Yi by the following Expression (2) using the above function f(t). Further, the presence place estimation unit 304 calculates a presence probability $p_X(t)$ that the search target person is currently present at the place X by the following Expression (3).

[Expression 2]

$$p_{Yi}(t) = P_{XYi} \times f(t) \quad (2)$$

[Expression 3]

$$p_x(t) = 1 - \sum_{i}^{n} p_{Yi}(t) \quad (3)$$

Here, $P_{XYi}$ is a probability that the moving destination of a person from the place X is the place Yi. That is, $P_{XYi}$ is a movement probability from the place X to each place Yi. The movement probability $P_{XYi}$ is a predetermined value based on a statistical result of people moving from the place X to the place Yi. As described above, in this example embodiment, the presence place estimation unit 304 estimates the place where the search target person is currently present using a presence probability calculated based on the predetermined movement probability for each place Yi that can be reached from the place X and the elapsed time t. By using the movement probability in this way, even when there are a plurality of destinations from the place X, it is possible to calculate the presence probability for each destination.

Figure 5:
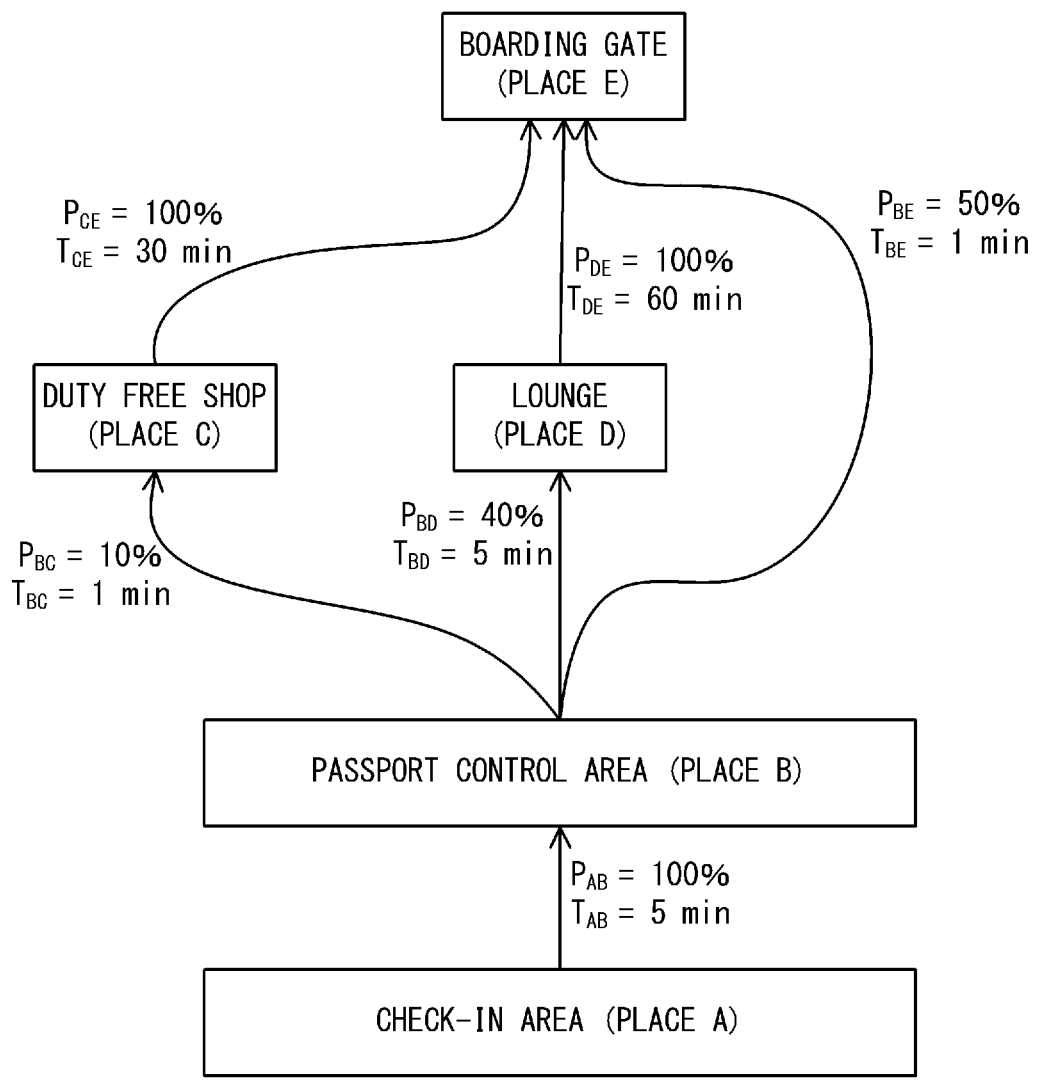
FIG. 5 is a schematic diagram showing an application example of the person search system according to the example embodiment.

The presence place estimation unit 304 calculates the presence probability of the search target person for each place as described above, and estimates the place where the search target person is present based on the magnitude of the presence probability. A specific application example of the person search system 10 is described below. FIG. 5 is a schematic diagram showing the application example of the person search system 10 according to this example embodiment. FIG. 5 shows an example of searching for a person at an airport. In the example shown in FIG. 5, the cameras 100 are installed in a check-in area (referred to as a place A), a passport control area (referred to as a place B), a duty free shop (referred to as a place C), a lounge (referred to as a place D), and a boarding gate (referred to as a place E).

For these places, routes in the forward direction are predetermined as shown by arrows in FIG. 5. Specifically, the person who has arrived at the place A is supposed to move to the place B after the place A. A movement probability $P_{AB}$ from the place A to the place B is set to 100% in advance, and a scheduled moving time $T_{AB}$ is set to five minutes in advance.

Further, the person who has arrived at the place B is supposed to move to one of the places C, D and E after the place B. A movement probability $P_{BC}$ from the place B to the place C is set to 10% in advance, and a scheduled moving time $T_{BC}$ is set to one minute in advance. A movement probability PBD from the place B to the place D is set to 40% in advance, and a scheduled moving time $T_{BD}$ is set to five minute in advance. A movement probability $P_{BE}$ from the place B to the place E is set to 50% in advance, and a scheduled moving time $T_{BE}$ is set to one minute in advance.

Further, the person who has arrived at the place C is supposed to move to the place E after the place C. A movement probability $P_{CE}$ from the place C to the place E is set to 100% in advance, and a scheduled moving time $T_{CE}$ is set to 30 minutes in advance. Further, the person who has arrived at the place D is supposed to move to the place E after the place D. A movement probability $P_{DE}$ from the place D to the place E is set to 100% in advance, and a scheduled moving time $T_{DE}$ is set to 60 minutes in advance.

For example, when the presence place estimation unit 304 confirms that the search target person has been present at the place B based on the latest presence information about the search target person, the presence place estimation unit 304 estimates the current location of the search target person as described below. That is, the presence place estimation unit 304 sets the place B as the place X, and each of the places C, D, and E as the place Yi, and calculates the presence probability of the search target person at each of the places B, C, D, and E as described above, thereby estimating the place where the search target person is currently present. Note that the presence place estimation unit 304 may estimate the place where the search target person is currently present based on the presence probability by any method. For example, the presence place estimation unit 304 may estimate the place where the presence probability exceeding a predetermined threshold is calculated to be the current location of the search target person, or may estimate the place where the presence probability is maximum to be the current location of the search target person.

Figure 6:
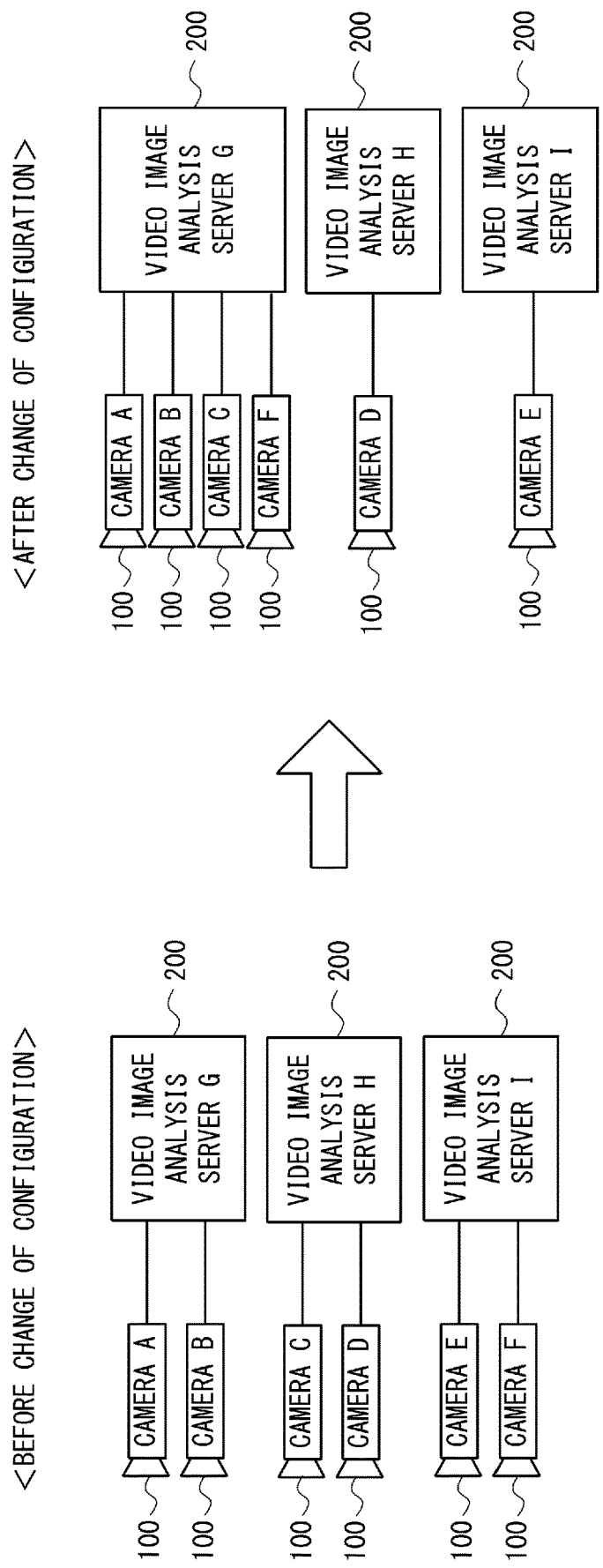
FIG. 6 is a schematic diagram showing a change of the configuration performed by a control unit.

The control unit 305 performs control to change the configuration or the setting related to generation of presence information in accordance with the result of the estimation performed by the presence place estimation unit 304. For example, the control unit 305 changes the configuration so that resources corresponding to the magnitude of the presence probability of each of the places where the cameras 100 are installed are allocated to processing for generating the presence information for each of the shot images of the places. Specifically, for example, the control unit 305 performs control to change the number of cameras 100 which the video image analysis server 200 takes charge of. FIG. 6 is a schematic diagram showing a change of the configuration performed by the control unit 305. In FIG. 6, the left section shows the correspondence between the cameras 100 and the video image analysis servers 200 before a change of the configuration performed by the control unit 305, and the right section shows the correspondence between the cameras 100 and the video image analysis servers 200 after the change of the configuration performed by the control unit 305. Before the change of the configuration, each video image analysis server 200 is in charge of analyzing video image data of the two cameras 100. When the presence place estimation unit 304 estimates that the search target person is currently present at the place D or E, the control unit 305 changes the configuration so that the video image analysis server 200 can focus on the analysis of the video image data of the camera 100 (a camera D) at the place D and the camera 100 (a camera E) at the place E. That is, the control unit 305 changes the configuration so that the video image analysis server 200 (a video image analysis server H) that processes the video image data of the camera D can concentrate its resources on the analysis of the video image data of the camera D (see the right section of FIG. 6). Similarly, the control unit 305 changes the configuration so that the video image analysis server 200 (a video image analysis server I) that processes the video image data of the camera E can concentrate its resources on the analysis of the video image data of the camera E (see the right section of FIG. 6). Accordingly, the control unit 305 assigns the analysis processing of the video image data of the camera C which the video image analysis server H takes charge of to a video image analysis server G, and assigns the analysis processing of the video image data of the camera F which the video image analysis server I takes charge of to the video image analysis server G. Thus, it is possible to search for the search target person while focusing on the area where the search target person is highly likely to be present.

Further, the control unit 305 may change the setting related to an image recognition processing performance for generating presence information for each of the shot images of the installation places of the cameras 100 in accordance with the result of the estimation performed by the presence place estimation unit 304. Referring to the example shown in FIG. 6, the control unit 305 changes the setting so that the performance of the image recognition processing performed when the video image data of the camera D is analyzed is improved. Similarly, the control unit 305 changes the setting so that the performance of the image recognition processing performed when the video image data of the camera E is analyzed is improved. Note that the setting related to the image recognition processing performance may be, for example, a setting of a frame rate (FPS: frames per second) of an image to be analyzed, or a setting of the number of face images that can be detected in one frame. By increasing set values of the above frame rate and number, it is expected that a more accurate recognition result will be obtained. Note that the control unit 305 may change the setting of the video image analysis server G, which has been changed so that it takes charge of four cameras, so that the performance of the image recognition processing performed when the video image data of each camera is analyzed becomes deteriorated in order to prevent the resources of the video image analysis server G from being insufficient.

The control unit 305 instructs the video image analysis server 200 to change the configuration or the setting. By doing so, the video image acquisition control unit 201 of the video image analysis server 200 acquires the video image data of the camera 100 instructed by the control unit 305 of the control server 300. Further, the presence information generation unit 202 of the video image analysis server 200 performs the analysis processing according to the setting instructed by the control unit 305 of the control server 300.

The search result output unit 306 searches for presence information indicating the current location of the search target person specified by search target person information. For example, the search result output unit 306 searches for presence information in which the difference between the current time and the shooting time is small, in other words, presence information in which the difference between the current time and the shooting time is within a predetermined period of time. As a result, the search result output unit 306 acquires presence information about the search target person that is generated by the video image analysis server 200 after the change performed by the control unit 305 and is accumulated in the presence information storage unit 302. The search result output unit 306 outputs the acquired presence information as the current location of the search target person. Note that the search result output unit 306 may output the acquired presence information to the search reception server 400 or to an apparatus such as a client terminal. The presence information output from the search result output unit 306 can be presented to a user as a search result by any method.

Figure 7:
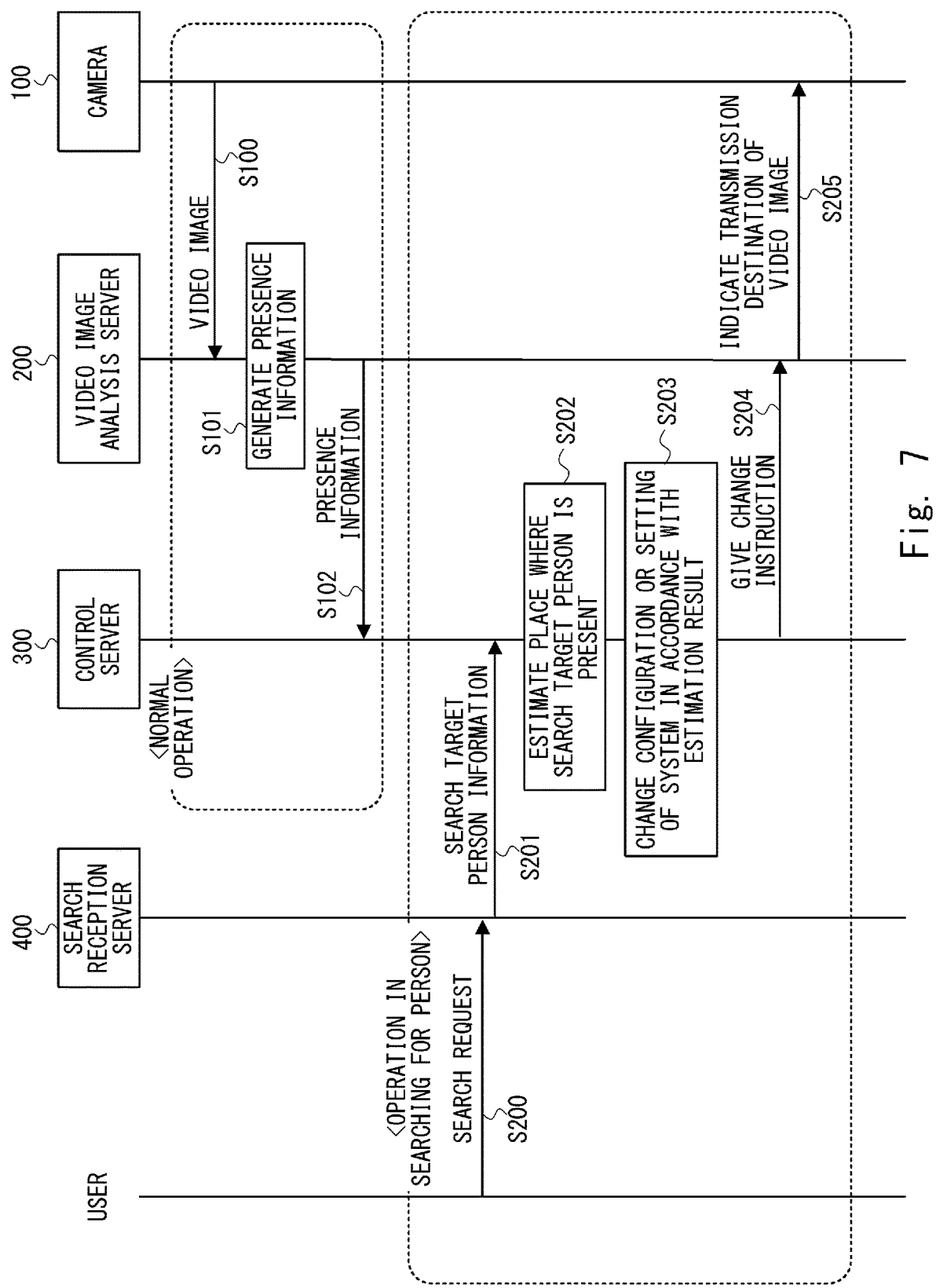
FIG. 7 is a sequence chart showing an example of an operation of the person search system according to the example embodiment.

Next, an operation flow of the person search system 10 is described. FIG. 7 is a sequence chart showing an example of the operation of the person search system 10.

First, a normal operation flow is described.

In Step 100 (S100), the video image acquisition control unit 201 of the video image analysis server 200 acquires the video image data transmitted from the camera 100.

Next, in Step 101 (S101), the presence information generation unit 202 of the video image analysis server 200 analyzes the video image data and generates presence information pieces of various persons.

Next, in Step 102 (S102), the presence information acquisition unit 301 of the control server 300 acquires the presence information output by the presence information output unit 203 of the video image analysis server 200. Then, the presence information acquisition unit 301 stores the acquired presence information in the presence information storage unit 302.

The presence information is sequentially generated and accumulated in the presence information storage unit 302.

Next, an operation flow at the time of searching for a person is described.

In Step 200 (S200), the search request reception unit 401 of the search reception server 400 receives a search request from a user.

Next, in Step 201 (S201), the search target person information output unit 402 of the search reception server 400 transmits search target person information to the control server 300 based on the search request, and the search target person information acquisition unit 303 of the control server 300 acquires the search target person information.

Next, in Step 202 (S202), the presence place estimation unit 304 of the control server 300 estimates the current location of the search target person based on the presence information accumulated in Step 102.

Next, in Step 203 (S203), the control unit 305 of the control server 300 determines to change the configuration and the setting of the system in accordance with the result of the estimation performed in Step 202.

Next, in Step 204 (S204), the control unit 305 of the control server 300 instructs the video image analysis server 200 to change its configuration and setting.

In Step 205 (S205), the video image acquisition control unit 201 indicates a transmission destination of the video image data to the camera 100 according to the instruction sent from the control server 300 in Step 204. That is, the video image acquisition control unit 201 notifies the camera 100 of a transmission destination of the video image data so that the video image data from the camera 100 which the server of the video image acquisition control unit 201 takes charge of reaches the server of the video image acquisition control unit 201. The camera 100 transmits the video image data to the video image analysis server 200 of the transmission destination according to the notification. In the following processing, under the configuration and the setting changed by the control unit 305, the presence information generation unit 202 performs analysis for searching for the search target person. In this way, it is possible to perform search processing focused on a place where the search target person is likely to be present.

Note that when the presence information of the search target person is generated by one of the video image analysis servers 200, the search result output unit 306 of the control server 300 acquires this information from the presence information storage unit 302 and outputs it as a search result.

The example embodiment has been described above. The person search system 10 estimates the place where the search target person is currently present using a presence probability calculated based on the amount of time elapsed from the point in time of the shooting. Thus, it is possible to search for the search target person who is scheduled to move.

Further, the person search system 10 changes the configuration or the setting of the system in accordance with the estimated result of the place where the search target person is present. Accordingly, it is possible to perform processing while focusing on the image analysis of the place where the search target person is more likely to be present. Thus, it is possible to efficiently use limited computing resources.

Note that the present disclosure is not limited to the above-described example embodiment and can be modified as appropriate without departing from the spirit of the present disclosure. For example, in the above-described example embodiment, although the person search system 10 includes a plurality of video image analysis servers 200, the number of video image analysis servers 200 may instead be one. In this case, for example, the control unit 305 of the control server 300 changes the setting so that the resources of the one video image analysis server 200 are allocated to the analysis processing for each camera 100 in accordance with the result of the estimation performed by the presence place estimation unit 304.

Further, the whole or part of the example embodiment disclosed above can be described as, but not limited to, the following supplementary notes.

(Supplementary Note 1)

An information processing apparatus comprising:

presence information acquisition means for acquiring presence information that is generated based on images shot for each of a plurality of predetermined places and indicates a place where a person is present at a point in time of the shooting of the images; and presence place estimation means for estimating a place where a specific person is currently present from among the plurality of predetermined places based on the presence information acquired by the presence information acquisition means, wherein the presence information includes time information at the point in time of the shooting, and the presence place estimation means estimates the place where the specific person is currently present using a presence probability of the specific person at the predetermined places, the presence probability being calculated based on an amount of time elapsed from the point in time of the shooting.

(Supplementary Note 2)

The information processing apparatus described in Supplementary Note 1, wherein the presence place estimation means estimates the place where the specific person is currently present using the presence probability calculated based on a predetermined movement probability from a first place to each of second places that can be reached from the first place and the amount of time elapsed from the point in time of the shooting, the first place is a place where the specific person is present at the time of the shooting among the plurality of predetermined places, and the second place is a place that can be reached from the first place among the plurality of predetermined places.

(Supplementary Note 3)

The information processing apparatus described in Supplementary Note 1 or 2, further comprising control means for changing a configuration or a setting related to generation of the presence information in accordance with a result of the estimation performed by the presence place estimation means.

(Supplementary Note 4)

The information processing apparatus described in Supplementary Note 3, wherein the control means allocates resources corresponding to a magnitude of the presence probability of each of the predetermined places to processing for generating the presence information for each of the shot images of the predetermined places.

(Supplementary Note 5)

The information processing apparatus described in Supplementary Note 3 or 4, wherein the control means changes a setting related to an image recognition processing performance for generating the presence information for each of the shot images of the predetermined places in accordance with the result of the estimation performed by the presence place estimation means.

(Supplementary Note 6)

The information processing apparatus described in Supplementary Note 5, wherein the setting related to the image recognition processing performance is a setting of a frame rate of an image to be analyzed.

(Supplementary Note 7)

The information processing apparatus described in Supplementary Note 5, wherein the setting related to the image recognition processing performance is a setting of the number of face images that can be detected in one frame.

(Supplementary Note 8)

A person search system comprising:

presence information generation means for generating, based on images shot for each of predetermined places, presence information indicating a place where a person is present at a point in time of the shooting of the images; and presence place estimation means for estimating a place where a specific person is currently present from among the plurality of predetermined places based on the presence information, wherein the presence information includes time information at the point in time of the shooting, and the presence place estimation means estimates the place where the specific person is currently present using a presence probability of the specific person at the predetermined places, the presence probability being calculated based on an amount of time elapsed from the point in time of the shooting.

(Supplementary Note 9)

The person search system described in Supplementary Note 8, wherein the presence information generation means generates the presence information by identifying a face included in the shot image.

(Supplementary Note 10)

A place estimation method comprising:

acquiring presence information that is generated based on images shot for each of a plurality of predetermined places and indicates a place where a person is present at a point in time of the shooting of the images; and estimating a place where a specific person is currently present from among the plurality of predetermined places based on the acquired presence information, wherein the presence information includes time information at the point in time of the shooting, and in the estimation of the place where the specific person is present, the place where the specific person is currently present is estimated using a presence probability of the specific person at the predetermined places, the presence probability being calculated based on an amount of time elapsed from the point in time of the shooting.

(Supplementary Note 11)

A non-transitory computer readable medium storing a program for causing a computer to execute:

a presence information acquisition step of acquiring presence information that is generated based on images shot for each of a plurality of predetermined places and indicates a place where a person is present at a point in time of the shooting of the images; and a presence place estimation step of estimating a place where a specific person is currently present from among the plurality of predetermined places based on the presence information acquired in the presence information acquisition step, wherein the presence information includes time information at the point in time of the shooting, and in the presence place estimation step, the place where the specific person is currently present is estimated using a presence probability of the specific person at the predetermined places, the presence probability being calculated based on an amount of time elapsed from the point in time of the shooting.

While the present disclosure has been described with reference to the example embodiment, the present disclosure is not limited to the aforementioned example embodiment. Various changes that can be understood by those skilled in the art can be made to the configurations and the details of the present disclosure within the scope of the present disclosure.

REFERENCE SIGNS LIST

1 INFORMATION PROCESSING APPARATUS
2 PRESENCE INFORMATION ACQUISITION UNIT

3 PRESENCE PLACE ESTIMATION UNIT
10 PERSON SEARCH SYSTEM
50 NETWORK INTERFACE
51 MEMORY
52 PROCESSOR
100 CAMERA
200 VIDEO IMAGE ANALYSIS SERVER
201 VIDEO IMAGE ACQUISITION CONTROL UNIT
202 PRESENCE INFORMATION GENERATION UNIT
203 PRESENCE INFORMATION OUTPUT UNIT
250 VIDEO IMAGE ANALYSIS SERVER GROUP
300 CONTROL SERVER
301 PRESENCE INFORMATION ACQUISITION UNIT
302 PRESENCE INFORMATION STORAGE UNIT
303 SEARCH TARGET PERSON INFORMATION ACQUISITION UNIT
304 PRESENCE PLACE ESTIMATION UNIT
305 CONTROL UNIT
306 SEARCH RESULT OUTPUT UNIT
400 SEARCH RECEPTION SERVER
401 SEARCH REQUEST RECEPTION UNIT
402 SEARCH TARGET PERSON INFORMATION OUTPUT UNIT

The invention claimed is:

1. An information processing apparatus comprising:
at least one memory storing program instructions; and
at least one processor configured to execute the instructions stored in the memory to:
acquire presence information that is generated based on images shot for each of a plurality of predetermined places and indicates a place where a person is present at a point in time of shooting of the images; and
estimate a current place where a specific person is currently present from among the plurality of predetermined places based on the acquired presence information, wherein
the presence information includes time information at the point in time of the shooting,
in estimation of the current place where the specific person is currently present, the current place is estimated using a presence probability of the specific person at each of the predetermined places, the presence probability being calculated based on an amount of time elapsed from the point in time of the shooting to a current time, and
the processor is further configured to execute the instructions to change a configuration or a setting related to generation of the presence information in accordance with a magnitude of the presence probability.

2. The information processing apparatus according to claim 1, wherein
the processor is further configured to execute the instructions to estimate the current place where the specific person is currently present using the presence probability calculated based on a predetermined movement probability from a first place to each of one or more second places that can be reached from the first place and the amount of time elapsed from the point in time of the shooting to the current time,
the first place is the place where the specific person is present at the point in time of the shooting among the plurality of predetermined places, and
each second place is a different place that can be reached from the first place among the plurality of predetermined places.

3. The information processing apparatus according to claim 1, wherein the processor is further configured to execute the instructions to allocate resources corresponding to the magnitude of the presence probability of each of the predetermined places to process for generating the presence information for each of the images that have been shot for the predetermined places.

4. The information processing apparatus according to claim 1, wherein the processor is further configured to execute the instructions to change a setting related to an image recognition processing performance for generating the presence information based on the images shot for each of the predetermined places in accordance with the result of the estimation of the current place where the specific person is present.

5. The information processing apparatus according to claim 4, wherein the setting related to the image recognition processing performance is a setting of a frame rate of a to-be-analyzed image.

6. The information processing apparatus according to claim 4, wherein the setting related to the image recognition processing performance is a setting of a number of face images that can be detected in one frame.

7. A person search system comprising:
at least one memory storing program instructions; and
at least one processor configured to execute the instructions stored in the memory to:
generate, based on images shot for each of a plurality of predetermined places, presence information indicating a place where a person is present at a point in time of shooting of the images; and
estimate a current place where a specific person is currently present from among the plurality of predetermined places based on the presence information, wherein
the presence information includes time information at the point in time of the shooting,
in estimation of the current place where the specific person is present, the current place is estimated using a presence probability of the specific person at each of the predetermined places, the presence probability being calculated based on an amount of time elapsed from the point in time of the shooting to a current time, and
the processor is further configured to execute the instructions to change a configuration or a setting related to generation of the presence information in accordance with a magnitude of the presence probability.

8. The person search system according to claim 7, wherein the processor is further configured to execute the instructions to generate the presence information by identifying a face included in each of the images that have been shot.

9. A place estimation method comprising:
acquiring presence information that is generated based on images shot for each of a plurality of predetermined places and indicates a place where a person is present at a point in time of shooting of the images; and
estimating a current place where a specific person is currently present from among the plurality of predetermined places based on the acquired presence information, wherein
the presence information includes time information at the point in time of the shooting,
in estimation of the current place where the specific person is present, the current place is estimated using a presence probability of the specific person at each of the predetermined places, the presence probability being calculated based on an amount of time elapsed from the point in time of the shooting to a current time, and the method further comprising changing a configuration or a setting related to generation of the presence information in accordance with a magnitude of the presence probability.

\* \* \* \* \*